No. 670,413. Patented Mar. 19, 1901.
P. W. TILLINGHAST.
FABRIC FOR TIRES.
(Application filed May 14, 1900.)
(No Model.)
Fig. 1. Fig. 2. Fig. 3. Fig. 4.
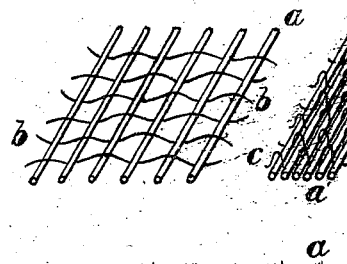
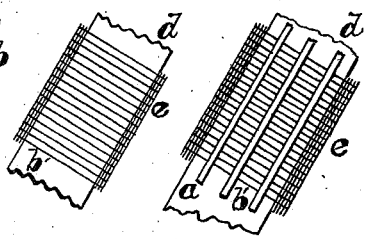
Fig. 13.
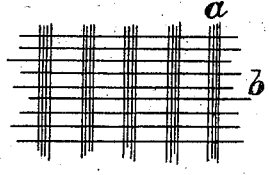
Fig. 5. Fig. 6. Fig. 7.
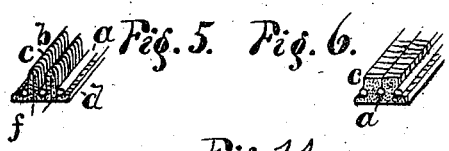
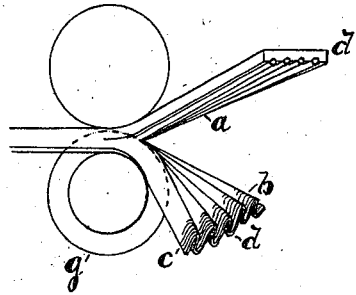
Fig. 14.
Fig. 8. Fig. 9. Fig. 10.
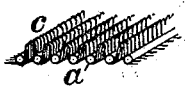
Fig. 11.
Fig. 12.
Witnesses
Socrates Scholfield
John J. Butler
Inventor
Pardon W. Tillinghast

UNITED STATES PATENT OFFICE.

PARDON W. TILLINGHAST, OF EDGEWOOD, RHODE ISLAND.

FABRIC FOR TIRES.

SPECIFICATION forming part of Letters Patent No. 670,413, dated March 19, 1901.

Application filed May 14, 1900. Serial No. 16,678. (No specimens.)

*To all whom it may concern:*

Be it known that I, PARDON W. TILLINGHAST, a citizen of the United States, residing at Edgewood, in the county of Providence and State of Rhode Island, have invented certain new and useful Improvements in Fabrics for Tires, of which the following is a specification.

My invention is applicable to the manufacture of all tires, but is designed more particularly for the large-section pneumatic automobile-tires, which are called upon to support a considerable weight, amounting in some cases to over one thousand pounds on each tire, and which in addition must be capable of successfully transmitting the energy exerted by the driving mechanism. Fabrics for tires of this class are usually of heavy woven or braided material, and although such material presents a more or less regular series of raised thread portions and intermediate depressions the attaching-surface presented for union with the rubber is substantially continuous in one plane and little in excess of a flat surface. The same may be said of the ordinary wound fabrics, the surface of which is equal to about one-half of the circumference of the parallel threads composing it. As heretofore constructed, the hard service to which tires of this class are subjected causes a separation of the layers of fabric and rubber and soon renders them worthless and unfit for further service. Vulcanization does not sufficiently unite the ordinary fabric and rubber to withstand the severe propelling and flexing strains to which these tires are subjected. In my construction I increase the holding or contact surface of the fabric beyond the point attained by the use of the ordinary woven, braided, or wound fabrics.

It is the object of my invention to supply a means of thoroughly uniting the plies of fabric and surrounding rubber in a tire, and I accomplish the desired end by increasing the surface of the fabric that is in contact with the rubber and by breaking the surface-line, so that it is not continuous in the same plane, and by means that are hereinafter more fully described so blend the several materials used that they become inseparably united and cannot be stripped the one from the other except by wilful destruction of the tire or fabric.

I am enabled to make a tire of lighter and stronger construction than those employing the common and well-known fabrics, which present a substantially smooth and continuous surface-line in the same plane.

In the accompanying drawings, Figure 1 shows an openly-woven fabric. Fig. 2 shows the same fabric with the warp-threads brought nearer together, forming loops of the weft-threads. Fig. 3 represents a rubber strip having cross-threads embedded in it. Fig. 4 is the same strip with longitudinal threads over the cross-threads. Fig. 5 represents the same strip corrugated in the direction of its length, forming loops of the cross-threads between the longitudinal threads. Fig. 6 is the same strip rolled down into a compact body. Fig. 7 illustrates another means of forming the strip shown in Figs. 5 and 6. Fig. 8 represents the product of Fig. 7. Fig. 9 is the same as it would appear with the rubber removed. Fig. 10 shows tape with looped and fringed edges. Fig. 11 shows the looped tape calendered onto rubber and curved around a thread. Fig. 12 shows a series of threads and tapes. Fig. 13 represents a modification of Fig. 1. Fig. 14 is the same fabric calendered onto a rubber strip and loops formed of the cross-threads.

Referring to Fig. 1, the fabric is composed of longitudinal threads $a$ and cross-threads $b$, interwoven with the threads $a$. A considerable space is left between the several threads $a$, so that when compressed laterally or brought more nearly together, as shown in Fig. 2, the cross-theads $b$ will be formed into loops $c$ and will extend beyond the plane of the threads $a$. The threads $a$ are preferably larger than the threads $b$ and may be woven closer together or more open than indicated in the drawings in order to vary the length of the loops $c$. The threads $a$ and $b$ may be treated with rubber solution before weaving or may afterward be frictioned or calendered onto sheet-rubber.

Figs. 3, 4, and 5 show one manner of producing this fabric. $d$ is a strip of sheet-rubber on which is calendered a strip of fibrous material consisting, essentially, of cross-threads only, the strip being made with sufficient selvage $e$ to hold the cross-threads $b$ in their relative positions. Longitudinal threads $a$ may be run on simultaneously with the threads *b*, or they may be run on in a separate operation, as shown in Fig. 4. The composite strip *d b a* is next corrugated between and parallel to the threads *a*, as shown in Fig. 5, in which the loops *c* are shown formed of the threads *b*, anchored to and extending above and beyond the plane of the threads *a*. The under surface of the rubber strip *d* contacts with or folds upon itself on the lines *f*, and being unvulcanized will adhere and form one solid mass. The corrugations may then be flattened somewhat by rolling or otherwise, so that the strip will present a substantially flat surface on each side, as shown in Fig. 6. The loops *c* would be opened or widened, and the whole strip is then a mass of rubber and fibrous loops secured to the inclosed threads *a*. This homogeneous strip is wound spirally around the air-tube of a tire, preferably, at an angle less than forty-five degrees to the axis of the tube. A second complete winding is then made in the reverse direction and at the same angle as the first winding. Enough sheet rubber is then applied to make the walls of the tire of a desired thickness. The size and strength of the threads *a* and *b* may be varied to correspond to the service required of them, and the loops *c* in the first winding may be shorter than the loops in the outer winding.

If desired, the threads *a* may be calendered onto one strip of rubber, and a strip *d b* (see Fig. 3) may then be taken, the two fed into suitable rolls, (see Fig. 7,) the flanges *g* of the under roll carrying the corrugations, which are really rows of loops, up between the threads *a* and into the upper rubber strip. The result would be as indicated in Fig. 8.

Fig. 9 illustrates a fabric made as above described as it would appear with the rubber removed.

Individual threads may be provided with the loops *c* in the following manner: A tape similar to *h* or *i*, Fig. 10, is calendered onto a rubber strip and curved around the thread *a*, as shown in Fig. 11. These threads may be used singly or a series of them be run into strip form, as shown in Fig. 12, and finished, as before described, and represented in Figs. 6 and 8, except that the product would have two rows of loops *c* instead of one between the several threads *a*.

Another means of producing a loop fabric is illustrated in Fig. 13. The fabric is first woven, as shown in Fig. 13, next calendered onto rubber, as in Fig. 3, and next corrugated, (see Fig. 14,) forming the loose cross-threads *b* into loops *c*. The spaces between the rows of loops *c* may be filled in by means of rubber threads, strips, or in any other suitable manner.

It is obvious that there are various ways of forming this loop fabric and accomplishing the object of this invention, and I do not limit myself to the particular means described for making a tire fabric having an irregular or broken surface, so that it is not continuous in the same plane.

I claim as my invention—

1. A fabric consisting of fibrous threads attached to, calendered on, embedded or inclosed in a rubber strip, and the product corrugated to form loops of one set of the threads, substantially as described.

2. A fabric consisting of longitudinal and cross threads, the latter forming loops that extend up between and beyond the longitudinal threads, the whole embedded or inclosed in rubber, substantially as described.

3. A fabric consisting of longitudinal and cross threads inclosed in rubber, the latter threads anchored to the longitudinal threads and extending into the inclosing rubber beyond the plane of said longitudinal threads, substantially as described.

4. The method of forming a fabric, consisting of embedding longitudinal and cross threads in a strip of rubber, and corrugating the strip to form loops of one set of threads, substantially as described.

5. A pneumatic tire consisting of one or more tubes or layers of rubber, in combination with a fabric having main threads applied to the tire to prevent bursting, and having other threads or fibers anchored to the main threads and extending out and beyond the plane of the said main threads into the surrounding rubber, all of the parts being vulcanized together, substantially as described.

6. In a pneumatic tire a sheath or cover for an air-tube, consisting of one or more tubes or layers of rubber, in combination with a fabric having main threads applied to the tire-sheath to prevent bursting, and having other threads or fibers anchored to the main threads and extending out and beyond the plane of the said main threads into the surrounding rubber, all of the parts being vulcanized together, substantially as described.

In testimony whereof I have signed my name to this specification in the presence of two subscribing witnesses.

PARDON W. TILLINGHAST.

Witnesses:
SOCRATES SCHOLFIELD,
JOHN J. BUTLER.